United States Patent
Kim et al.

(10) Patent No.: US 7,477,345 B2
(45) Date of Patent: Jan. 13, 2009

(54) LIQUID CRYSTAL DISPLAY AND METHOD FOR MANUFACTURING THE SAME

(75) Inventors: Woong-Kwon Kim, Gyeonggi-do (KR); Kwang-Sik Oh, Gyeongsangbuk-do (KR); Myung-Woo Nam, Gyeongsangbuk-do (KR); Ki-Du Cho, Gyeongsangbuk-do (KR); Se-Jong Shin, Daegu-si (KR); Bong-Chul Kim, Daegu-si (KR); Kwon-Seob Choi, Chungcheongbuk-do (KR)

(73) Assignee: LG Display Co., Ltd., Seoul (KR)

( * ) Notice: Subject to any disclaimer, the term of this patent is extended or adjusted under 35 U.S.C. 154(b) by 507 days.

(21) Appl. No.: 11/090,941

(22) Filed: Mar. 28, 2005

(65) Prior Publication Data

US 2005/0253984 A1 Nov. 17, 2005

(30) Foreign Application Priority Data

Mar. 30, 2004 (KR) ...................... 10-2004-0021539

(51) Int. Cl.
G02F 1/1335 (2006.01)
(52) U.S. Cl. ...................... 349/108; 349/106
(58) Field of Classification Search ................... 349/43, 349/106
See application file for complete search history.

(56) References Cited

U.S. PATENT DOCUMENTS

| 6,573,960 B2 | 6/2003 | Kobayashi et al. |
| 6,738,204 B1 * | 5/2004 | Chuang et al. ............... 359/891 |
| 2001/0005245 A1 | 6/2001 | Sakamoto et al. |

* cited by examiner

Primary Examiner—David Nelms
Assistant Examiner—Phu Vu
(74) Attorney, Agent, or Firm—McKenna Long & Aldridge LLP (57) ABSTRACT

A method for manufacturing a liquid crystal display includes forming a plurality of gate lines and data lines on a substrate, the plurality of gate and data lines cross each other and defining a plurality of unit pixel regions displaying red, green, and blue colors, forming a plurality of thin film transistors in each unit pixel regions, forming a passivation layer on the substrate, forming a green color filter layer on the substrate within a unit pixel region displaying the green color, forming one of a red color filter layer and a blue color filter layer within a unit adjacent to the unit pixel region displaying the green color, and within a portion of the green color filter layer overlapping the thin film transistor, depositing an organic insulating layer on the substrate and forming a contact hole, and forming a plurality of pixel electrodes corresponding to each unit pixel region.

16 Claims, 5 Drawing Sheets

LIQUID CRYSTAL DISPLAY AND METHOD FOR MANUFACTURING THE SAME

The present invention claims the benefit of Korean Patent Application No. 2004-021539, filed in Korea on Mar. 30, 2005, which is hereby incorporated by reference.

BACKGROUND OF THE INVENTION

1. Field of the Invention

The present invention relates to a liquid crystal display (LCD), and more particularly, to an LCD having a COT structure, which replaces to omit a black matrix generally formed on a TFT substrate with a stack structure color filter layers, thereby simplifying a fabrication process, improving the picture quality, and a method for manufacturing the same.

2. Description of the Related Art

The rapid progress in the semiconductor technology promoted production of LCDs having a slim profile and a lightweight characteristic, and LCD products having more excellent performance. Related art cathode ray tubes (CRTs) are widely used as information display devices having many advantages in terms of performance and price, while having many disadvantages in terms of miniaturization and portability.

Unlike the CRTs, the LCDs having advantages, such as a relatively small size, slim profile, lightweight, increased portability, and low power consumption, have attracted attentions of users, industry and researchers. The LCDs are introduced as one of the display devices actively replacing the CRTs to overcome the disadvantages of the CRT. Accordingly, more and more LCDs have been installed on most information processing apparatus requiring a display device today.

The LCD is a display device using modulation of light created in a liquid crystal cell. Generally, a voltage is applied to the liquid crystal having a specific molecular arrangement to change the specific arrangement into different molecular arrangements. Application of voltage to the liquid crystal cell converts an optical property, such as birefringence, an optical rotatory power, dichroism, and light scattering characteristics, into a visual property.

The related art LCD is manufactured by a method including forming an upper substrate and a lower substrate, followed by forming of an LC cell constituting the unit of a pixel, forming an alignment layer and rubbing the formed alignment layer, attaching the upper substrate and the lower substrate, filling liquid crystal into a space between the upper substrate and the lower substrate and sealing an liquid crystal inlet. In particular, while forming the upper substrate of the LCD, a black matrix for shielding light, and red (R), green (G) and blue (B) color filter layers are formed through a plurality of masking processes. Similarly, in forming the lower substrate of the LCD, gate lines for applying driving signals, data lines for applying data signals, and pixel electrodes for forming an electric field using applied data signals are formed through a plurality of masking processes.

However, the related art LCD has a disadvantage that the manufacturing process is complicated because the color filter layers and the pixel arrays are respectively formed on the upper substrate and the lower substrate, thereafter the lower substrate and the upper substrate are attached. In addition, the related art LCD has a drawback in low picture quality. When misalignment occurs while attaching the lower and upper substrates, the black matrix of the upper substrate does not completely shield light progressing from the lower substrate resulting in lower picture quality.

To overcome the above described disadvantages, there has been proposed a COT (Colorfilter On TFT) technique in which a pixel array including color filter layers and pixel electrodes are formed on a single glass substrate. Unlike in the related art LCD, the LCD having the COT structure includes the black matrix and the color filter layer formed on the lower substrate where TFTs and pixel electrodes are formed. Accordingly, the related art LCD having the COT structure has an advantage that the manufacturing process is simplified compared to the related art LCD having two separate substrates.

However, forming the color filter layer and the black matrix together with the TFTs require an additional masking process to form black matrix on the TFTs, which results in increased manufacturing cost in the related art LCD having the COT structure.

SUMMARY OF THE INVENTION

Accordingly, the present invention is directed to a liquid crystal display and method for manufacturing the same that substantially obviates one or more problems due to limitations and disadvantages of the related art.

An object of the present invention is to provide a liquid crystal display having a COT structure and method for manufacturing the same that can omit the black matrix forming process to decrease the number of used masks, simplify the manufacturing process, and improve the picture quality by forming color filter layers at regions where the black matrix is being formed.

Additional features and advantages of the invention will be set forth in the description which follows, and in part will be apparent from the description, or may be learnt by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a method for manufacturing a liquid crystal display comprises forming a plurality of gate lines and a plurality of data lines on a substrate, the plurality of gate lines cross the plurality of data lines and defining a plurality of unit pixel regions to display red, green, and blue colors, forming a plurality of thin film transistors in the plurality of unit pixel regions, forming a passivation layer on the substrate, forming a green color filter layer on the substrate within one of the unit pixel regions displaying the green color, forming one of a red color filter layer and a blue color filter layer on a portion of the substrate within one of the unit pixel regions adjacent to the unit pixel region displaying the green color, and on a portion of the green color filter layer overlapping the thin film transistor, depositing an organic insulating layer on an entire surface of the substrate including the green, red, and blue color filter layers, forming a contact hole through the organic insulating layer disposed on each of the plurality of thin film transistors, and forming a plurality of pixel electrodes corresponding to the plurality of unit pixel regions.

In another aspect of the present invention, a method for manufacturing a liquid crystal display comprises sequentially forming a gate line, a gate electrode, a channel layer, a source/drain electrode, and a data line on a substrate, forming a passivation layer on the substrate including the gate line, the data lines, the gate electrode, the source/drain electrodes, and the channel layer, forming a green color filter layer on the substrate including the passivation layer, sequentially forming a red color filter layer and a blue color filter layer on the substrate including the green color filter layer, depositing an organic insulating layer on an entire surface of the substrate including the green, red, and blue color filter layers, forming a contact hole through the organic insulating layer, and forming a pixel electrode on the substrate including the contact hole.

In another aspect of the present invention, a method for manufacturing a liquid crystal display comprises forming a gate line, a gate electrode, a channel layer, a source/drain electrode, and a data line on a substrate through sequential masking processes, forming a passivation layer on the substrate including the gate line, the data lines, the gate electrode, source/drain electrodes, and the channel layer, forming a green color filter layer on the substrate including the passivation layer, forming a red color filter layer and a blue color filter layer on the thin film transistor disposed on the substrate including a portion of green color filter layer in a stack structure, wherein the green filter layer is formed on the thin film transistor, depositing an organic insulating layer on an entire surface of the substrate including the green, red and blue color filter layers, forming a contact hole through the organic insulating layer, and forming a pixel electrode on the substrate including the contact hole.

In another aspect of the present invention, a liquid crystal display comprises a substrate, a gate line, a data line, and a thin film transistor disposed on the substrate, red, green, and blue color filter layers respectively disposed within corresponding pixel regions in a stack structure on the thin film transistor, an organic insulating layer disposed on the green, red, and blue color filter layers to planarize a surface of the red, green and blue color filter layers, and a pixel electrode disposed on the organic insulating layer corresponding to the red, green, and blue color filter layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
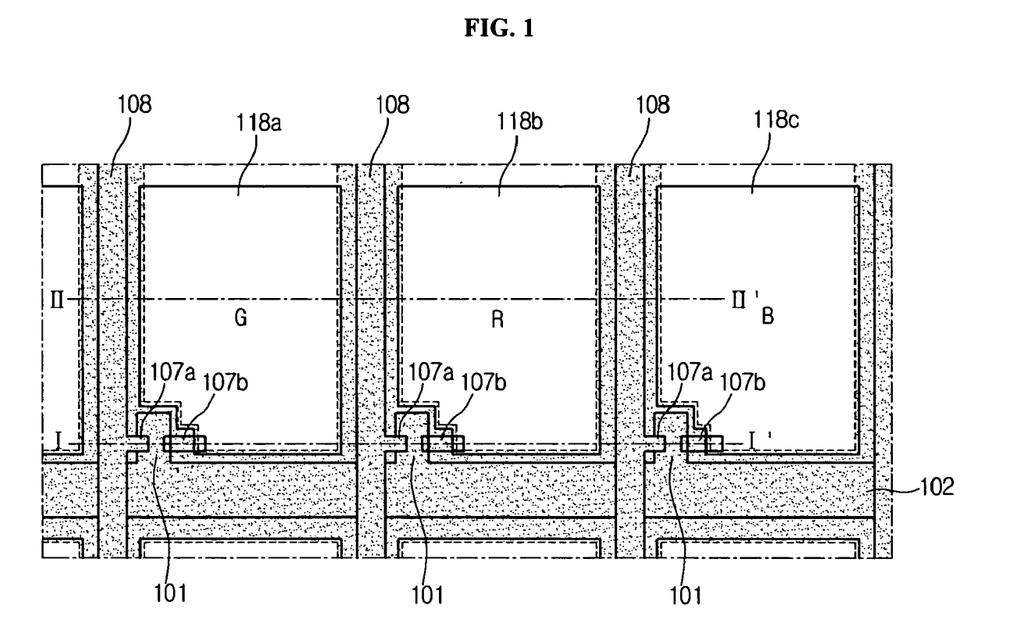
FIG. 1 is a plan view of an exemplary LCD having a COT (Colorfilter On TFT) structure according to a first exemplary embodiment of the present invention.

FIG. 1 is a plan view of and exemplary pixel structure of an LCD having a COT (Colorfilter on TFT) structure according to a first exemplary embodiment of the present invention. In FIG. 1, a plurality of data lines 108 and a plurality of gate lines 102 cross perpendicular to each other to define unit pixel regions. Green (G), red (R), and blue (B) color filter layers are disposed on the unit pixel regions. Pixel electrodes 118a, 118b, and 118c are respectively disposed on the green (G), red (R), and blue (B) color filter layers, overlapping the green (G), red (R), and blue (B) color filter layers.

In FIG. 1, the symbols "G," "B" and "R" respectively indicate the green (G), red (R), and blue (B) color filter layers formed beneath the pixel electrodes 118a, 118b, and 118c. A thin film transistor (TFT) serving as a switching element is disposed adjacent to an intersecting point of the data line 108 and the gate line 102. The TFT includes a gate electrode 101 partially branched from the gate line 102, a source electrode 107a, and a drain electrode 107b.

The LCD having the COT structure is characterized in that a light shielding layer is formed in a stack structure of R, G, and B color filter layers, wherein R color filter layer or B color filter layer has a low reflectivity with respect to external light. The light shielding layer is disposed on or above the gate line 102, the data line 108, and the region where the TFT is formed.

According to the present invention, the light shielding layer can be formed by stacking combined color filter layers in a same process where the color filter layers are being formed without performing an additional process. The region hatched along the gate line 102, the data line 108, and the TFT, in FIG. 1, corresponds to a region where the light shielding layer is formed.

An exemplary process for manufacturing an LCD having a COT structure will now be described with reference to FIGS. 2A through 2F. First, referring to FIG. 2A, a metal layer is formed on a transparent insulating substrate 100, and patterned to form a plurality of gate lines (not shown) and a plurality of gate electrodes 101. The gate lines and the gate electrodes are patterned by a photolithography process, which includes coating a photoresist film on the substrate 100 including the metal layer, exposing and developing the coated photoresist film, and etching the exposed metal film. After the gate electrodes 101 and the gate lines are formed on the substrate 100, a gate insulating layer 103 is deposited on an entire surface of the resultant substrate 100.

Figure 2A:
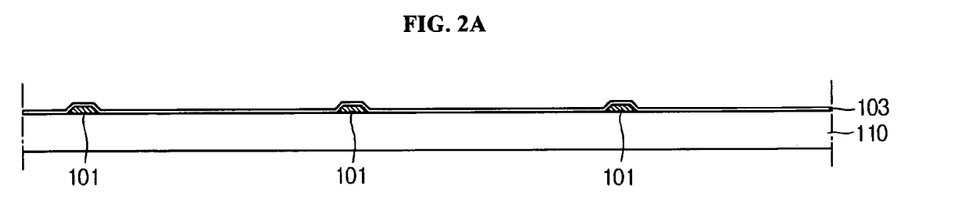
FIGS. 2A through 2F are cross-sectional views along I-I' of FIG. 1 illustrating an exemplary process of forming a stack structure according to the present invention.
Figure 2B:
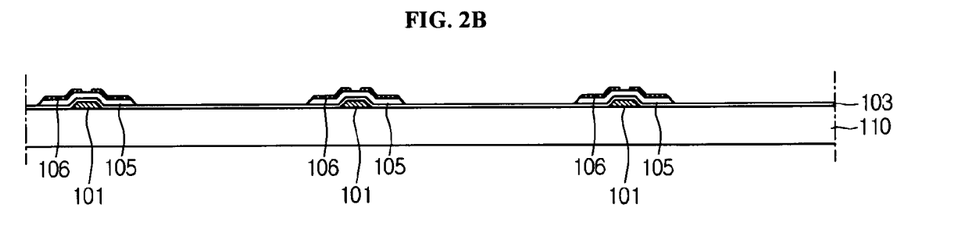

Next, referring to FIG. 2B, an undoped amorphous silicon layer and an impurity-doped amorphous silicon layer (n+Si:H) are sequentially deposited on the gate insulating layer 103 of the substrate. After the undoped amorphous silicon layer and the impurity-doped amorphous silicon layer (n+Si:H) are sequentially deposited, a photolithography process is performed to form a channel layer 105 and an ohmic contact layer 106 on the gate electrode 101.

Figure 2C:
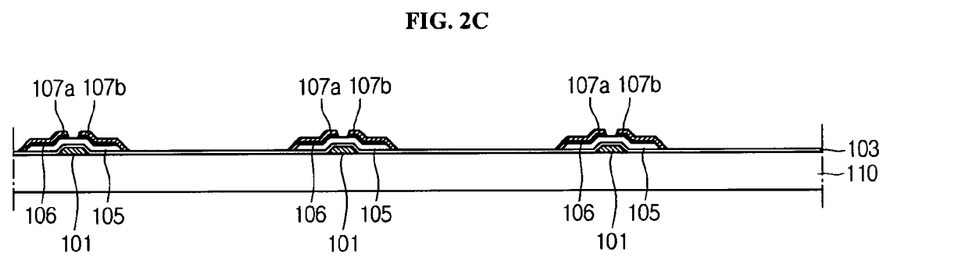

Next, referring to FIG. 2C, a metal layer for forming source and drain electrodes 107a and 107b and data lines (not shown) is deposited on the resultant substrate 100 including the channel layer 105 and the ohmic contact layer 106. Thereafter, the metal layer is patterned by a photolithography process described in relation to FIG. 2A to form the source electrode 107a, the drain electrode 107b, and the data lines (not shown) at the same time. As the source and drain electrodes 107a and 107b are formed, a TFT serving as a switching element is completed. The data lines are formed traversing between the pixel regions.

Figure 2D:
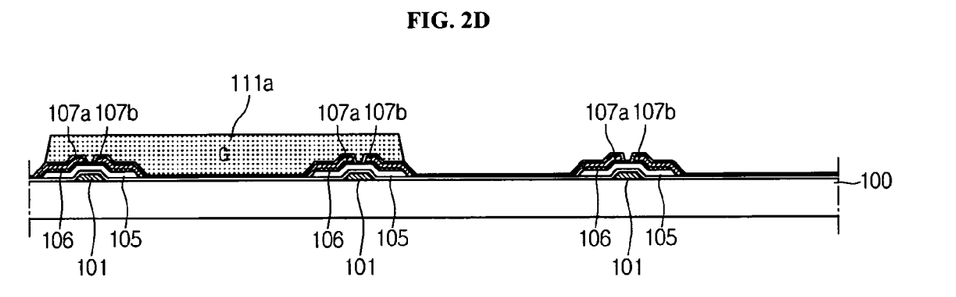

Next, referring to FIG. 2D, a passivation layer 109 is formed on the resultant substrate 100 including the source and drain electrodes 107a and 107b and the data lines so as to protect the elements formed on the substrate 100. Thereafter, a photolithography process for forming R, G and B color filter layers on pixel regions is performed. A contact hole is not formed in the passivation layer in this process.

Meanwhile, a green (G) color resin having the highest reflectivity is first coated and then developed to form a green (G) color filter layer 111a. It is noted that the green (G) color filter layer 111a is formed on a first upper surface area of the TFT disposed in a first corresponding unit pixel and a first upper surface area of the TFT disposed in a second unit pixel adjacent to the first unit pixel. As shown in FIG. 2D, both edges of the green color filter layer 111a are disposed on two adjacent TFTs.

Figure 2E:
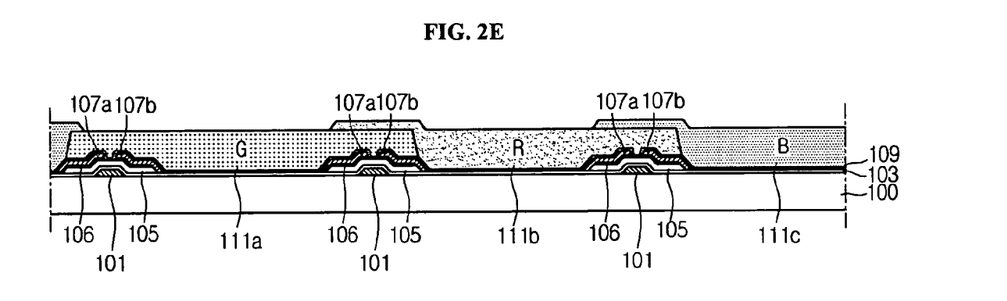

Next, referring to FIG. 2E, a red (R) color filter layer 111b is formed such that one edge portion of the red (R) color filter is formed on the green (G) color filter layer 111a in a stack structure which is disposed on the TFT, and the other edge portion is disposed on the adjacent TFT. After the red (R) color filter layer 111b is formed, a blue (B) color resin is coated on an entire surface of the resultant substrate 100 and then etched to form a color filter layer 111c. One edge portion of the blue (B) color filter layer 111c is formed on the red (R) color filter layer 111b disposed on the TFT, and the other edge portion is formed on the green (G) color filter layer 111a disposed on the TFT, wherein all color filter layer are formed in the stack structure.

Accordingly, the stacked color filter layers formed on the TFTs in the first exemplary embodiment performs a light shielding function, thereby omitting the need for a black matrix. In addition, the color filter layers are stacked such that the green color filter layer 111a having the highest reflectivity is disposed at lowest location among the three color filter layers.

The red (R) color filter layer 111b and the blue (B) color filter layer 111c, each having a reflectivity lower than the green (G) color filter layer 111a, are positioned higher than the green (G) color filter layer 111a. This arrangement prevents the reflection of external light incident from an outside of the LCD.

Figure 2F:
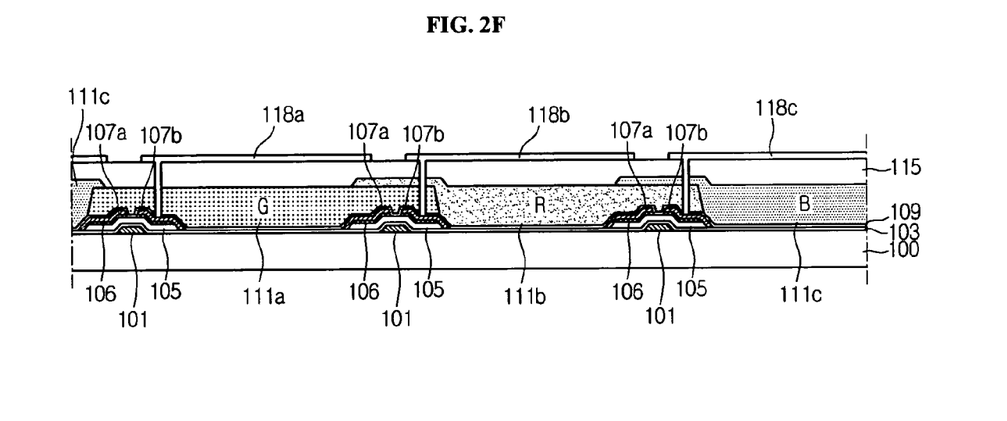

As shown in FIG. 2F, after the G, R, and B color filter layers 111a, 111b, and 111c are formed in such respective order, an organic insulating layer 115 is deposited on an entire surface of the resultant substrate 100 to planarize an upper surface of the resultant substrate 100. The organic insulating layer 115 is made of one material selected from the group consisting of photo-acryl, benzo cyclobutene (BCB), silicon oxide (SiOx), and silicon nitride (SiNx). After the organic insulating layer 115 is deposited on the entire surface of the resultant substrate 100 including the color filter layers 111a, 111b, and 111c, a process for forming a contract hole exposing an upper surface of the drain electrode 107b is performed.

In forming the contact hole forming process, a photoresist is coated on the organic insulating layer 115, then patterned by photolithography processes including exposing and developing to form a mask pattern. The organic insulating layer 115, the stacked color filter layers, and the passivation layer 109 provided on the drain electrode 107 are sequentially etched using the mask pattern to form a contact hole exposing the upper surface of the drain electrode 107b. After the contact hole is formed in the organic insulating layer 115, a transparent indium tin oxide (ITO) is deposited on an entire surface of the resultant substrate 100 and is then patterned to form pixel electrodes 118a, 118b and 118c corresponding to the respective color filter layers 111a, 111b and 111c.

While the above described first exemplary embodiment mainly shows and discusses the processes for forming the color filter layers and the TFTs, it can be understood that the data line is formed in the same process.

Figure 3:
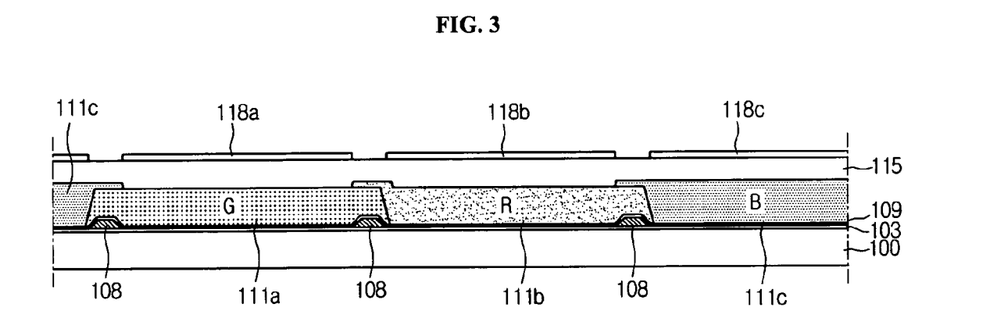
FIG. 3 is a cross-sectional view along II-II' of FIG. 1 according to the present invention.

FIG. 3 is a cross-sectional view taken along line II-II' of FIG. 1 and shows a plurality of data lines in the LCD having the COT structure and its surrounding. Referring to FIG. 3, the gate insulating layer 103 is formed on the substrate 100, but the undoped amorphous silicon layer and the impurity-doped amorphous silicon layer are not provided on the data lines 108 because two layers are removed while the active layer of the TFT is formed. Furthermore, the data lines 108 are formed in parallel with the gate lines while the source and drain electrodes of the TFT are formed.

When the COT substrate is completed by depositing the passivation layer 109 on the resultant substrate 100 including the data lines 108, the green (G), red (R), and blue (B) color filter layers are sequentially formed by the processes described with reference to FIGS. 2A through 2F.

As shown in FIG. 2F, in the first exemplary embodiment, the green (G) filter layer 111a having the highest reflectivity with respect to external light is first formed in accordance with the order of color filter layer formation. The green (G) color filter layer 111a is formed on the selected pixel regions and the data lines 108 adjacent to the selected pixel regions.

After the green filter layer 111a is formed, the red (R) color filter layer 111b is formed on the selected pixel regions. At this time, one edge portion of the red (R) color filter layer 111a is formed in a stack structure on the green (G) color filter layer 111a formed on one data line 108. The other edge portion of the red (R) color filter layer 111b is formed directly on an upper surface of the adjacent data line 108. Thereafter, one edge portion of the blue (B) color filter layer 111c is formed in a stack structure on the red (R) color filter layer 111b formed on the data lines 108. Thus, the cross-sectional structure of FIG. 3 along II-II' of FIG. 1 is similar to the cross-sectional structure of the color filter layers shown in FIG. 2F, and the regions where the light shielding layer is formed in FIG. 1 have the same stack structure.

Accordingly, the above described first exemplary embodiment of the present invention has an advantage that the light shielding layer having a low reflectivity with respect to external light can be formed through the process of forming the color filter layers having the stack structure only. And, a separate process for forming light shielding layer is not required.

While the cross-sectional view of FIG. 3 shows the elements disposed on the data lines, the color filter layers having the similar structure to the color filter layers of FIG. 3 are also formed on the gate lines.

Figure 4A:
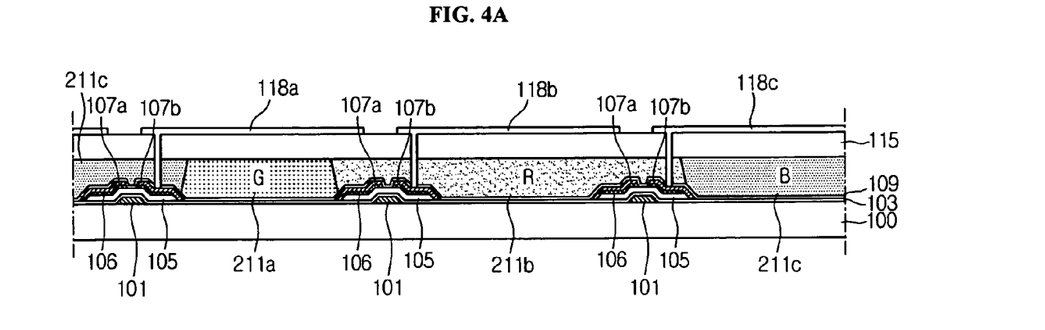
FIGS. 4A and 4B are cross-sectional views along I-I' of FIG. 1 according to a second exemplary embodiment of the present invention.
Figure 4B:
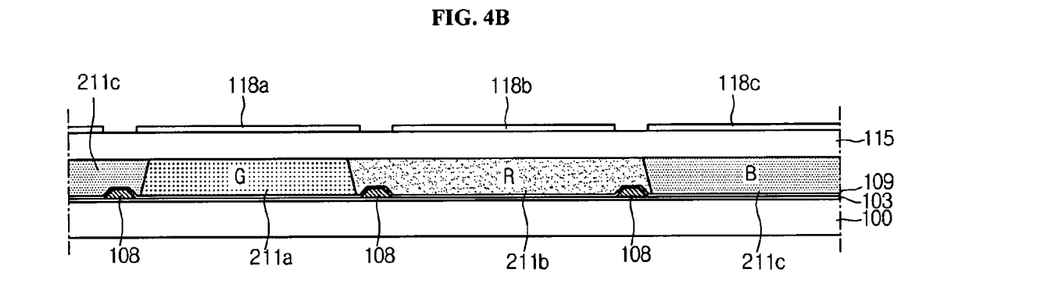

FIG. 4A is a cross-sectional view taken along line I-I' of FIG. 1 according to a second exemplary embodiment of the present invention, and FIG. 4B is cross-sectional view taken along line II-II' of FIG. 1 according to the second exemplary embodiment of the present invention.

Unlike the first exemplary embodiment described with reference to FIGS. 2A through 2F, the second exemplary embodiment shown in FIG. 4A is characterized in that a green filter layer 211a is formed only within a pixel region regardless of an arrangement order of green (G), red (R), and blue (B) color filter layers.

As shown in FIG. 4A, the green (G) color filter layer 211a is formed within the pixel region between adjacent TFTs only. However, it is noted that red (R) and blue (B) color filter layers 211b and 211c, formed subsequent to the green (G) color filter layer 211a, are adjacent to the green (G) color filter layer 211a and their both edge portions are formed on the TFTs.

In particular, when the red (R) color filter layer 211b is formed before the blue (B) color filter layer 211c, one edge portion of the red (R) color filter layer 211b is adjacent to one edge portion of the green (G) color filter layer 211a, and both edge portions of the red color filter layer 211b are formed on the TFTs. Thereafter, the blue (B) color filter layer 211c is formed such that its one edge portion is formed adjacent to the green (G) color filter layer 211a on the TFT and the other edge portion is formed adjacent to the red (R) color filter layer 211b.

As shown in FIG. 4A, each color filter layer is formed in inclined manner about normal to the substrate. The green (G) filter layer 211a is formed within the unit pixel regions only and having the green color filter layer inclined away from the thin film transistors. Thereafter, the red (R) color filter layer 211b and the blue color filter layer 211c are formed sequentially. The disposed red (R) and (B) color filter layers are also formed in the inclined manner. Accordingly, the resultant color filter layer formed on the TFT has a stack structure of color filter layers including the red (R) 211b and the blue (B) 211c. The resultant color filter layer in the stack structure on the TFTs further lowers reflectivity with respect to external light.

As described above, the second exemplary embodiment described with reference to FIG. 4A is characterized that the green (G) filter layer 211a is formed in a limited portion within the unit pixel regions. And, the red (R) color filter layer 211b and the blue color filter layer 211c formed on the TFTs serve as a black matrix. Accordingly, the red (R) and blue (B) color filter layers form a reflective layer having a low reflectivity with respect to external light.

FIG. 4B shows a region where the data lines are formed. As shown in FIG. 4B, the green (G) filter layer 211a is formed within the unit pixel region between the adjacent data lines. The red (R) color filter layer 211b or the blue (B) color filter layer 211c, formed subsequent to the green (G) color filter layer 211a, is adjacent to the green (G) color filter layer 211a and their both edge portions are formed on the adjacent data lines.

For example, the red (R) color filter layer 211b is formed before the blue (B) color filter layer 211c, one edge portion of the red (R) color filter layer 211b is adjacent to one edge portion of the green (G) color filter layer 211a and both edge portions of the red (R) color filter layer 211b are formed on the data lines. Thereafter, the blue (B) color filter layer 211c is formed such that its one edge portion is formed adjacent to the green (G) color filter layer 211a on the data line and the other edge portion is formed adjacent to the red (R) color filter layer 211b.

As shown in FIG. 4B, each color filter layer is formed in inclined manner about normal to the substrate. The green (G) filter layer 211a is formed only within the unit pixel regions and having the green color filter layer inclined away from the data lines 108. Thereafter, the red (R) color filter layer 211b and the blue color filter layer 211c are formed sequentially. The disposed red (R) and (B) color filter layers are also formed in the inclined manner. Accordingly, the resultant color filter layer formed on the data lines 108 has a stack structure of color filter layers including the red (R) 211b and the blue (B) 211c. The resultant color filter layer in the stack structure on the data lines 108 further lowers reflectivity with respect to external light.

Figure 5A:
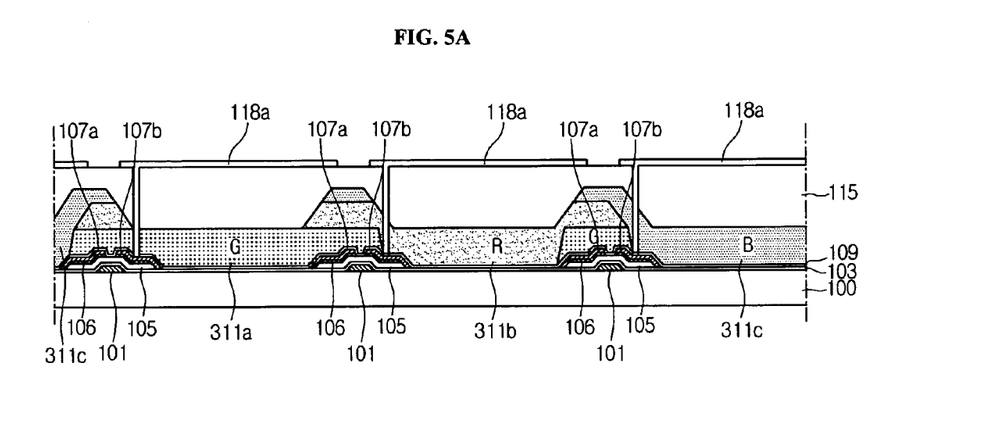
FIGS. 5A and 5B are cross-sectional views taken along I-I' of FIG. 1 according to a third exemplary embodiment of the present invention.
Figure 5B:
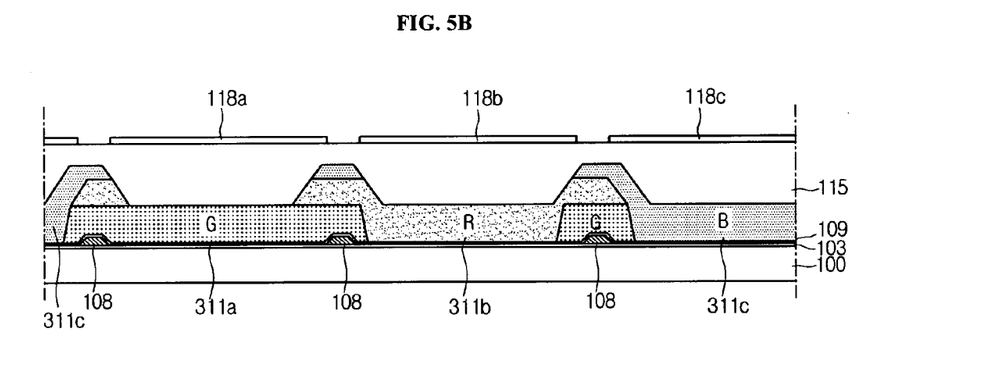

FIG. 5A is a cross-sectional view taken along line I-I' of FIG. 1 according to a third exemplary embodiment of the present invention, and FIG. 5B is cross-sectional view taken along line II-II' of FIG. 1 according to the third exemplary embodiment of the present invention. The COT structure shown in FIG. 5A shows that the green (G), red (R), and blue (B) color filter layers are stacked on the TFT in the respective order. The third exemplary embodiment of FIG. 5A is characterized in that red (R) and blue (B) color filter layers 311b and 311c are formed regardless of their formation order after the green (G) color filter layer 311a is formed.

As shown in FIG. 5A, after the TFT and a passivation layer 315 are formed, the green (G) color filter layer 311a is formed on the TFT using green (G) color resin. The third exemplary embodiment of the present invention is characterized in that the green filter layer 311a is formed on the TFTs disposed on selected one pixel region and another pixel region adjacent to the selected one pixel region. When it is assumed that the red (R), green (G), and blue (B) color filter layers 311b, 311a and 311c forms one pixel, the green (G) filter layer 311a is formed on each of the TFTs disposed within each pixel region.

For example, in FIG. 5A, the green (G) color filter layer 311a is formed on all TFTs formed on the substrate 100. After the green (G) color filter layer 311a is formed on the substrate 100, red color resin is coated on the resultant substrate and is then patterned to form the red (R) color filter layer 311b. At this time, like the green (G) color filter layer 311a, the red (R) color filter layer 311b is formed on the TFTs disposed on selected one pixel region and another pixel region adjacent to the selected one pixel region.

The red (R) color filter layer 311b is formed on all TFTs formed on the substrate 100 within the selected pixel region. The green (G) color filter layer 311a and the red (R) color filter layer 311b are sequentially stacked in respective order on each of the TFTs. After the red (R) color filter layer 311b is formed on the substrate 100, the blue (B) color filter layer 311c is formed using blue color resin. The blue color resin is coated and patterned to form the blue (B) color filter layer 311c. Accordingly, a stack structure of the color filter layer 311a, the red (R) color filter layer 311b and the blue (B) color filter layer 311c is made.

In FIG. 5A, the green (G) color filter layer 311a having the lowest reflectivity is formed at the bottom first, thereafter the red (R) color filter layer 311b and the blue (B) color filter layer 311c are sequentially formed in the respective order on the green color filter layer 311a. Alternatively, the green (G) color filter layer 311a is formed at the bottom first, thereafter the blue (B) color filter layer 311c and the red (R) color filter layer 311b are sequentially formed in the respective order on the green color filter layer 311a.

FIG. 5B is a cross-sectional view illustrating a region where the data lines are formed. In the third exemplary embodiment shown in FIG. 5B, the red (R) color filter layer 311b and the blue (B) color filter layer 311c are formed regardless of their formation order subsequent to the formation of the green filter layer 311a. As shown in FIG. 5B, after the passivation layer 315 are formed on the substrate which includes the data lines 108, the green (G) color filter layer 311a is formed on the data lines disposed at both edge portions of selected one pixel region using green (G) color resin. In addition, the green (G) filter layer 311a is formed even on the data line of an adjacent pixel region.

Accordingly, when it is assumed that the red (R), green (G), and blue (B) color filter layers 311b, 311a, and 311c forms one pixel, the green (G) filter layer 311a is formed on all the TFTs disposed within all the pixel regions.

As described above, the green (G) color filter layer 311a is formed on the corresponding pixel regions and on all the data lines formed on the substrate 100. After the green (G) color filter layer 311a is formed on the substrate 100, red color resin is coated on the resultant substrate, then patterned to form the red (R) color filter layer 311b. The red (R) color filter layer 311b is formed on the green (G) color filter layer 311a, such that the data lines 108 disposed at both edge portions of the selected one pixel region and one of the data line 108 disposed at one edge portion of adjacent pixel region to the selected one pixel region, receive the stack structure of color filter layers including green (G) and red (R) color filter layers in the respective order.

The red (R) color filter layer 311b is formed on the selected pixel regions and on all the data lines. As a result, on each of the TFTs, the red (R) color filter layer 311b is stacked on the green (G) filter layer 311a. After the red (R) color filter layer 311b is formed, the blue (B) color filter layer 311c is formed using blue color resin, in which the blue color resin is coated and patterned to form the blue (B) color filter layer 311c. Accordingly, on each of the TFTs, a stack structure of the green (G) color filter layer 311a, the red (R) color filter layer 311b and the blue (B) color filter layer 311c in the respective order are made.

In FIG. 5B, the green (G) color filter layer 311a having the lowest reflectivity is formed at the bottom, and the red (R) color filter layer 311b and the blue (B) color filter layer 311c are sequentially formed in the respective order on the green color filter layer 311a. Alternatively, the green (G) color filter layer 311a is formed at the bottom, and the blue (B) color filter layer 311c and the red (R) color filter layer 311b are sequentially formed in the respective order on the green color filter layer 311a.

According to the third exemplary embodiment, since the green (G), red (R), and blue (B) color filter layers are sequentially formed on the TFTs, the data lines and the gate lines in the same stack structure, light reflectivity with respect to external light is lowered, thereby enhancing the picture quality.

As described above, according to the present invention, the manufacturing process for forming the black matrix in the related art LCD having the COT structure, can be omitted by stacking color filter layers serving as the black matrix. A stack structure color filter layers has a low reflectivity on the region where the related art black matrix would have been formed, thereby simplifying the manufacturing process. Furthermore, since the color filter layers having the low reflectivity prevent external light from being reflected thereon, picture quality can be improved.

It will be apparent to those skilled in the art that various modifications and variations can be made in the liquid crystal display and method for manufacturing the same of the present invention without departing from the spirit or scope of the invention. Thus, it is intended that the present invention covers the modifications and variations of this invention provided they come within the scope of the appended claims and their equivalents.

What is claimed is:

1. A method for manufacturing a liquid crystal display, comprising:
    forming a plurality of gate lines and a plurality of data lines on a substrate, the plurality of gate lines cross the plurality of data lines and defining a plurality of unit pixel regions to display red, green, and blue colors;
    forming a plurality of thin film transistors in the plurality of unit pixel regions;
    forming a passivation layer on the substrate;
    forming a green color filter layer on the substrate within one of the unit pixel regions displaying the green color;
    forming a red color filter layer on a portion of the substrate within one of the unit pixel regions adjacent to the unit pixel region displaying the green color, and on a portion of the green color filter layer overlapping the thin film transistor, the gate line and the data line;
    forming a blue color filter layer on a portion of the substrate within one of the unit pixel regions adjacent to the unit pixel region displaying the red color, and on a portion of the red color filter layer overlapping the thin film transistor, the gate line and the data line;
    depositing an organic insulating layer on an entire surface of the substrate including the green, red, and blue color filter layers;
    forming a contact hole through the organic insulating layer disposed on each of the plurality of thin film transistors; and
    forming a plurality of pixel electrodes corresponding to the plurality of unit pixel regions.

2. The method according to claim 1, wherein the green color filter layer is formed on a first upper surface of the thin film transistor disposed within the unit pixel displaying the green color and a first upper surface of the thin film transistor disposed adjacent to the instant unit pixel.

3. The method according to claim 1, wherein the red color filter layer has one edge portion in a stack structure on the thin film transistor where the green color filter layer is disposed between the red color filter layer and the thin film transistor.

4. The method according to claim 1, wherein the blue color filter layer has one edge portion in a stack structure on the thin film transistor where the green color filter layer is disposed between the blue color filter layer and the thin film transistor.

5. The method according to claim 4, wherein the blue filter layer has the other edge portion in a stack structure on the thin film transistor where the red color filter is disposed between the blue color filter layer and the thin film transistor.

6. A method for manufacturing a liquid crystal display, comprising: sequentially forming a gate line, a gate electrode, a channel layer, a source/drain electrode, and a data line on a substrate;
    forming a passivation layer on the substrate including the gate line, the data lines, the gate electrode, the source/drain electrodes, and the channel layer; forming a green color filter layer on the substrate including the passivation layer; sequentially forming a red color filter layer and a blue color filter layer on the substrate including the green color filter layer;
    depositing an organic insulating layer on an entire surface of the substrate including the green, red, and blue color filter layers;
    forming a contact hole through the organic insulating layer; and
    forming a pixel electrode on the substrate including the contact hole,
    wherein the green color filter layer is formed within a first pixel region, a thin film transistor, the gate line and the data line are disposed within the first pixel region, and a second thin film transistor, the gate line and the date line are disposed within a second pixel region adjacent to the first pixel region.

7. The method according to claim 6, wherein after the green color filter layer is formed, the red color filter layer and the blue color filter layer are sequentially formed in a respective order.

8. The method according to claim 6, wherein after the green color filter layer is formed, the blue color filter layer and the red color filter layer are sequentially formed in a respective order.

9. The method according to claim 6, wherein the red color filter layer is formed within a pixel region where the red color filter layer is formed extending to an upper surface of the data line, the gate line, and the thin film transistor of the pixel region.

10. The method according to claim 6, wherein the blue color filter layer is formed within a pixel region where the blue color filter layer is formed extending to an upper surface of the data line, the gate line, and the thin film transistor of the pixel region.

11. The method according to claim 6, wherein one of the red color filter layer and the blue color filter layer is formed on the data line, the gate line, and the thin film transistors within a portion where the green color filter layer is formed.

12. The method according to claim 6, wherein the green color filter layer is formed within a pixel region that is not included the thin film transistor.

13. The method according to claim 12, wherein the red color filter layer is formed within a pixel region where the red color filter layer is formed extending to an upper surface of the data line, the gate line, and the thin film transistor of the pixel region.

14. The method according to claim 12, wherein the blue color filter layer is formed within a pixel region where the blue color filter layer is formed extending to an upper surface of the data line, the gate line, and the thin film transistor of the pixel region.

15. The method according to claim 6, wherein one of the red color filter layer and the blue color filter is formed on the data line, the gate line, and the thin film transistor disposed on the substrate.

16. The method according to claim 6, wherein the red color filter layer and the blue color filter layer are formed in a stack structure on the data line, the gate line, and the thin film transistor disposed on the substrate.

* * * * *